Dec. 14, 1965   R. R. HAGER   3,222,999
FLUID PRESSURE SERVOMOTOR
Filed Dec. 31, 1962
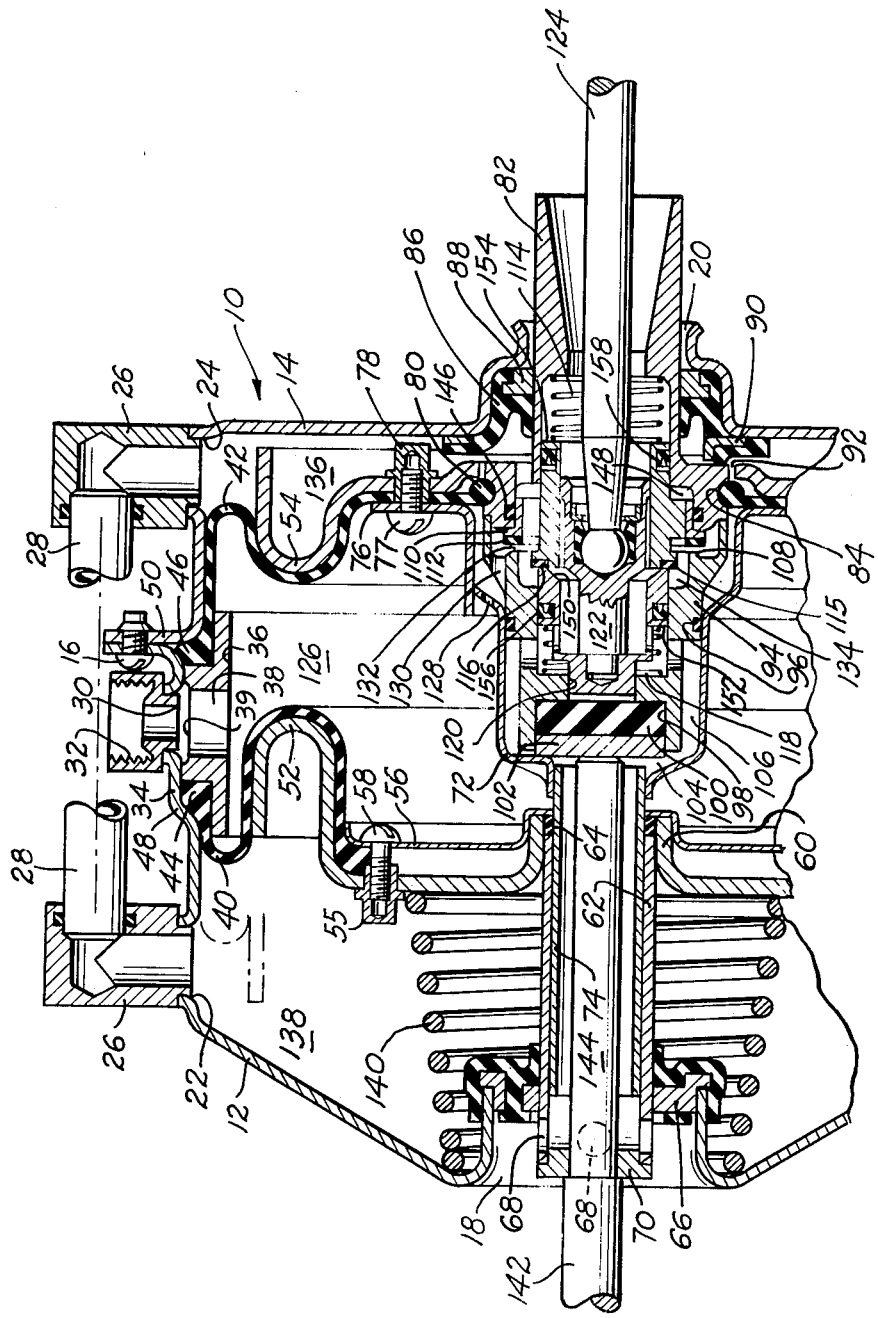
INVENTOR.
ROBERT R. HAGER.
BY
*Richard G. Geib*
ATTORNEY.

United States Patent Office 3,222,999
Patented Dec. 14, 1965

3,222,999
FLUID PRESSURE SERVOMOTOR
Robert R. Hager, South Bend, Ind., assignor to The Bendix Corporation, South Bend, Ind., a corporation of Delaware
Filed Dec. 31, 1962, Ser. No. 248,334
9 Claims. (Cl. 91—434)

This invention relates to a fluid pressure servomotor utilizing a fluid pressure controlled by a valve having means to assist valve operation.

It is a principal object of this invention to provide a fluid pressure operated device having feel means with means to assist control of the fluid pressure.

It is also an object of this invention to provide a fail-safe mechanical connection when power is not available to operate the servomotor.

Other objects of this invention will become readily apparent to those skilled in the art from the following description of the drawing showing a partial section of a fluid pressure servomotor.

In more detail, a servomotor housing 10 is shown comprised of cup-shaped shells 12 and 14 joined as by the bolt connection 16. The shells are provided with axial openings 18 and 20, respectively, and with radial ports 22 and 24, respectively, adjacent opposite ends of the assembled housing 10. Fittings 26 are resistance welded, silver soldered, etc., to the ports 22 and 24, and a conduit 28 communicates each end of the housing with one another. As seen in the drawing, shell 12 is also provided with a radial opening 30 to which a female threaded fitting 32 is affixed as by the methods joining and sealing fittings 26 to each of the shells. Adjacent the fitting 32 the shell 12 is raised, as at 34; and immediately underlying such raised portion an annular spacer 36, having an opening 38 in registry with a groove 39 aligned with the port or opening 30. As seen in the drawing, the spacer is essentially a "hat-shaped" structure.

A pair of diaphragms 40 and 42 are joined to the inner walls of housing 10 by the spacer 36 due to the compressive action on diaphragm beads 44 and 46 when tightening bolt 16 to join shells 12 and 14. The bead 46 also seals the joint between the shells 12 and 14, as seen in the drawing. The compressive action takes place between the rear wall 48 of the raised portion 34 and the radial flange 50 of shell 14.

Within the assembled housing a pair of movable walls 52 and 54 are mounted. More particularly, the wall 52 is provided with a cap nut 55, and a collar 56 is appropriately drilled to receive bolts 58 so that upon screwing bolts 58 into cap nuts 56 the diaphragm 40 is joined with the movable wall 52. Inwardly of the housing, the movable wall 52 is provided with an annular opening surrounded by an annular flange 60. The flange 60 is affixed to a sleeve 62, as by resistance welding or the like, and extends beyond the sleeve to abut with the innermost portion of collar 56. The space between the end of sleeve and the collar 56 is filled with a seal ring 64 of rubber or the like.

In turn, the sleeve 62 is slidably supported by a bearing seal guide 66 such as is more particularly described in my copending United States application No. 234,946. Such a bearing seal, as shown, is constructed of a rubber body having a bearing material reinforcement member embedded therein, such as phenolic, brass, wood, etc.

The sleeve 62 is also provided with radial openings 68 adjacent an end plug 70.

As for the movable wall 54, a valve housing 72 having a forwardly projecting sleeve 74 integral therewith is slidably supported within sleeve 62. The valve housing has a radial flange 76 appropriately drilled to receive bolts 77, which bolts are screwed into captive nuts 78 on the movable wall 54. The captive nuts extend through the movable wall to locate the diaphragm thereon. Thus, the movable wall 54 is held by the valve housing 72 within the housing 10.

The diaphragm extends inwardly of the valve housing 72 and terminates in an annular beaded portion 80. The bead 80 is used to hold a valve structure within the housing 72 such that the valve housing may move with respect to the valve structure. In more detail, a valve control member 82 is provided with an annular groove 84 which receives the bead 80. The member 82 is also supported by a bearing seal having an annular reinforcing bearing structure 88 embedded in an elastomeric substance 86. As seen, the seal is arranged to fit within a cavity formed in shell 14. In addition to reinforcement 88 an annular washer 90 is embedded in the peripheral portions of the seal, which washer is adapted at spaced intervals to space the valve housing from the shell 14 to allow fluid passage from chamber 134 to chamber 136. This serves as a stop for the valve control member 82. As is also seen in the drawing a gap 92 is left between the inner edges of the movable wall and the valve control member. However, the gap is not large enough to allow extrusion of the bead 80.

The valve control member 82 is joined with rear portion 94 which is adapted to slidingly fit within the housing 72 with an O ring seal 96 to seal such sliding fit. The rear portion is also formed with a chamber 98 in which a rubber disc or similar deformable body 100 is placed. The remainder of the chamber 98 is filled with a metal plate 102 which forms a rear stop for the valve structure in housing 72. However, the housing 72 is formed with a passageway 104 to communicate the inner chamber of sleeve 62 to the space 106 about the rear control member. The rear control member 94 is provided with an annular seat 108.

Within the assembled valve control member and rear portion an annular valve poppet 110 carrying an outer rubber ring 112 is reciprocally mounted in the valve control member 82 and biased by a spring 114 toward the annular valve seat 108 of the rear portion 94. In addition, an inner rubber ring 115 is provided on the annular poppet 110. The inner ring 115 is arranged to seat on an annular valve seat 116 which is biased by the spring 114 to abut on ring 115. An additional spring 118 is provided to bias the valve structure to its normal nonenergized position. The annular valve seat 116 is formed with a projection arranged to slide within the rear portion 94 in a bore 120 leading to the chamber 98. The projection is in turn drilled to receive a manual control member 122, which control member is operated by a force transmitting rod 124.

To connect the servomotor to a power system, a fluid pressure source is connected to the fitting 32 and chamber 126 is pressurized. The fluid pressure passes through opening 128 into housing 72 and then through various openings, such as 130 in rear portion 94, to the radial passage 132 to an outer valve chamber 134, which chamber is open to a rear chamber 136 in housing 10. As above-mentioned, the rear chamber 136 is communicated to a front chamber 138 by conduit 28 and fittings 26. This is the normal nonoperative condition of the servomotor with the valve control member resting on the bearing seal stop 90.

In operation, as a force causes inward movement of rod 124 and the manual control member 122, spring 114 causes the annular poppet 110 to follow. This moves the ring 112 on to the seat 108 and closes passage 132. This closes communication of chambers 136 and 138 with chamber 126. Further movement of rod 124 causes seat 116 to move away from the poppet ring 115. This then opens chambers 136 and 138 to space 106 via valve chamber 134. Space 106 is in turn communicated directly to atmosphere via openings 68. If the servomotor 10 were to be utilized in a vacuum power system, then openings 68 would be connected to a vacuum power source such as an engine intake manifold (not shown). Ultimately the wall 52 may move, thus, the pressure differential between chambers 126 and 138 overcome spring 140 causing wall 52 to move to a position shown by the phantom lines whereupon the inner portions of wall 52 are abutting the bearing seal stop 66. Normally, however, the wall 52 will perform the work required before abutting the seal stop.

When the desired amount of work has been accomplished the pressure differential between chambers 126 and 136 is acting on wall 54 to transmit a force to the valve housing 72. This force acts on plate 102 and thru disc 100 to return seat 116 to sealing contact with ring 115. Thus, communication between chambers 134 and 106 is closed.

As may be readily observed, the pressure differential between chambers 126 and 136 will provide resistance to valve operation. In other words, the output force of servomotor 10 will be proportionally felt in rod 124. This proportion may be varied by increasing or decreasing the effective area of the wall 54. However, one method of allowing various feel ratios can be more readily obtained through variance of the disc 100, as to the areas transmitting force to the servomotor housing and the valve structure. The gap between the valve structure and the disc 100 may be changed to require a greater or lesser pressure differential across wall 54 before this force is transmitted to rod 124. This force to close any one gap between disc 100 and the member 122 is a constant.

A rod 142 is provided with a stepped down portion 144 so that end plate 70 abuts the shoulder of rod 142 where it is of reduced diameter, and the stepped down portion abuts the plate 102 in chamber 98. Thus, as the movable wall 52 moves down it carries rod 142 with it.

As seen, the valve seat 108 has a contact area with the valve poppet ring 112 which area is equal to the outer diameter of poppet 110 in contact with the seal 146. Thus, the fore and aft areas of ring 112 and poppet 110 exposed to operating pressure are equal; and the areas exposed to control pressure of chamber 134 are equal, due to a cavity 148 being formed behind the poppet 110. Likewise, the inner valve seat member has a beveled face 150 leading to seat 116, which face has an area exposed to a pressure equal to the area of a rear face 152 of the valve seat exposed to the same pressure. In addition, face 154 of the inner valve poppet is dimensioned so as to have the same area as face 152 of the valve seat member and is arranged to be exposed to the same pressure to balance the inner structure of the servomotor valve; and in a similar manner the seals 156 and 158 are of the same diameter to prevent pressure unbalance. It may be readily appreciated that by varying any of these areas, other than a balanced valve may be provided. In fact, if one were to increase the area of seat 108, then one could get pressure assist for closing poppet ring 112 on to seat 108 and vise versa.

In releasing the force on rod 124, passage 132 is opened to vent chamber 126 to chambers 136 and 138 through passage 132 via the inner valve chamber 134 to equalize the pressure of all three chambers 126, 136 and 138.

In the event of power failure the force applied to rod 124 provides a mechanical by-pass link through the disc 100, the plate 102, and the stepped down portion 144 of the rod 142. This would carry the valve housing 72 along.

In addition, as seen in the drawing, the valve housing 72 is of stepped configuration so that the pressure responsive area of the valve housing in chamber 126 is greater than the pressure responsive area of the valve housing in chamber 136. Thus, initial force applied to rod 124 does not translate wall 54, as the pressure in chamber 126 must be overcome by the operator of rod 124. In event of loss of power supply this resistance to movement of wall 54 is reduced so that after each application less resistance to valve translation is encountered.

The foregoing description was to illustrate but one form in which this invention may be found and was not intended as limiting the scope of the invention which is bounded only by the appended claims.

I claim:
1. In a fluid pressure device a housing;
a first movable wall in said housing;
a second movable wall;
a first diaphragm connecting said first movable wall to said housing;
a second diaphragm connecting said second movable wall to said housing;
a valve housing having a portion mounted within said housing, said valve housing having a portion being slidably mounted through said first movable wall and affixed to said second movable wall to support said movable walls in said housing and permit relative movement therebetween; and
a fluid control valve slidably mounted within said valve housing and held by said second diaphragm for relative movement with respect to said valve housing.

2. A fluid pressure device according to claim 1 wherein said fluid control valve comprises:
a first annular valve seat having a preselected pressure responsive area;
a first annular valve member adapted to engage said first annular valve seat such that said pressure responsive area is equal on each side of said first valve seat;
a second annular valve seat concentric with said first annular valve seat, said second annular valve seat having a preselected pressure responsive area; and
a second annular valve member adapted to engage said second annular valve seat such that said pressure responsive area is equal on each side of said second valve seat.

3. A fluid pressure device comprising;
a housing having axially aligned openings;
a first movable wall within said housing, said first movable wall having an axially extending portion slidably projecting through one of said openings;
a first diaphragm connecting said first movable wall to said housing to sealingly divide said housing into front and rear variable volume chaambers;
a second movable wall in said housing within said rear chamber, said second movable wall having a central opening of preselected diameter;
a second diaphragm connected to said housing and said second movable wall to divide said rear chamber into a first and second variable volume chamber, said second diaphragm having an annular bead extending inwardly of said second movable wall which bead partially projects below said opening;
a valve housing such that said valve structure may move inwardly in said valve housing and such that said valve structure is prevented from rearward movement, as respects said second movable wall slidably mounted within said portion of said first movable wall, said valve housing being affixed to said second movable wall;
a valve structure having an annular groove receiving said second diaphragm bead to connect said valve structure with said second movable wall within said valve housing; and
a force transmitting member operatively connected to said valve structure and said first movable wall.

4. A fluid presssure device comprising:

a housing having axially aligned openings;

a first movable wall within said housing, said first movable wall having an axially extending portion projecting through one of said openings;

a first bearing seal support for guiding said portion of said first movable wall through said one of said openings, said first bearing seal being provided with resilient stop means limiting movement of said first movable wall in said housing;

a spring interposed with said housing and said first movable wall, which spring normally urges said first movable wall out of contact with said first bearing seal resilient stop means;

a first diaphragm connecting said first movable wall to said housing to sealingly divide said housing into front and rear variable volume chambers which front chamber contains said pressure responsive member and said first movable wall portion;

a second movable wall in said housing within said chamber behind said first movable wall;

a second diaphragm connected to said housing, said second diaphragm having an annular beaded portion;

a valve housing having a tubular portion slidably mounted within said axially extending portion of said first movable wall;

a means connecting said second diaphragm and said valve housing to said second movable wall such that said annular beaded portion projects inwardly of said valve housing;

a valve member having an annular groove arranged to receive said annular beaded portion of said diaphragm to prevent said valve member from becoming free of said second movable wall, while at the same time holding said valve member such that said valve member has relative movement with regard to said valve housing;

a second bearing seal support for guiding said valve member through said other of said axial openings opposite said first bearing seal support, said second bearing seal support forming a stop means for said valve member;

a means for operating said valve member; and a force transmitting member operatively connected to both said valve member and said portion of said first movable wall such that said valve member and said first movable wall may move said force transmitting member.

5. A fluid pressure device according to claim 4 and further comprising a deformable member operatively interposed with said valve member and said force transmitting member.

6. A fluid pressure device comprising:

a housing having axially aligned openings;

a first movable wall within said housing, said first movable wall having an axially extending tubular portion of lesser internal diameter than said openings, said first movable wall apportioning said housing into front and rear variable volume chambers;

a second movable wall in said rear variable volume chamber dividing said rear chamber into first and second variable volume chambers;

a valve housing affixed to said second movable wall in said housing said valve housing having stepped portions with a smaller of said portions slidably mounted within said tubular portion of said first movable wall, and a valve structure mounted for relative movement in said valve housing for controlling communication of fluid pressure between said first variable volume chamber and said front and second variable volume chambers said valve structure having a member substantially equal in diameter to the larger portion of said housing, which member slidably projects through one of the axially aligned openings in said housing to reduce the pressure responsive area of said second movable wall in said second variable volume chamber as compared with the pressure responsive area of said second movable wall in said first variable volume chamber whereby said second movable wall is rearwardly biased by fluid pressure.

7. For a servomotor a fluid control valve comprising:

a first valve seat having a pressure response area;

a first valve member adapted to engage said first valve seat such that said pressure responsive area is equal on each side of said first valve seat;

a second valve seat concentric with said first annular valve seat, said second annular valve seat having a pressure responsive area; and a second valve member adapted to engage said second valve seat such that said pressure responsive area is equal on each side of said second valve seat.

8. In a fluid pressure device according to claim 1 and further comprising a reaction means including a deformable body operatively connected to said portion of said valve housing to transmit reactive forces on said first diaphragm and said second diaphragm collectively and independently of each other.

9. A fluid pressure device according to claim 3 and further comprising a reaction means including a deformable body within a chamber in the valve housing and a plate ahead of said deformable body and projecting from said chamber to abut the valve housing and the force transmitting member independently of each other so that said deformable body conveys reactive forces on the first movable wall and on the force transmitting member collectively and separately.

References Cited by the Examiner

UNITED STATES PATENTS

| | | | |
|---|---|---|---|
| 2,989,035 | 6/1961 | Stelzer | 91—376 |
| 3,075,499 | 1/1963 | Prather | 91—391 |
| 3,076,441 | 2/1963 | Ayers | 91—434 |
| 3,078,677 | 2/1963 | Cripe | 91—376 |
| 3,083,698 | 4/1963 | Price | 91—376 |
| 3,110,031 | 11/1963 | Price | 91—376 X |

FRED E. ENGELTHALER, *Primary Examiner.*

SAMUEL LEVINE, *Examiner.*